Fig.1.

Dec. 13, 1966  CHIA HUAN LEE  3,292,047
CIRCUIT BREAKER CONTROL CIRCUIT
Filed July 12, 1963  3 Sheets-Sheet 2

United States Patent Office 3,292,047
Patented Dec. 13, 1966

3,292,047
CIRCUIT BREAKER CONTROL CIRCUIT
Chia Huan Lee, Monroeville, Pa., assignor to Westinghouse Electric Corporation, Pittsburgh, Pa., a corporation of Pennsylvania
Filed July 12, 1963, Ser. No. 294,713
12 Claims. (Cl. 317—11)

This invention relates to improvements in a control circuit for circuit breakers for use in alternating current lines, where there may be a transient direct current component as well, as in the case where a fault suddenly occurs in the alternating current system, and more particularly to an improved circuit for opening the contacts of a breaker at substantially zero current.

The control circuit of the instant invention may be used with alternating currents of any power frequency. It is especially suitable for use with a circuit breaker having an invariable inherent short time delay of a quarter of a cycle or less between the application of a predetermined invariable potential to the tripping coil and the subsequent opening of the breaker contacts, such as a vacuum breaker preferably having a very short contact movement of, for example, ⅛ of an inch, to provide a time of travel for the contacts from "make" position to fully "open" position of, for example, about one millisecond. Other delays due to current and flux buildup in the solenoid, latch travel, etc. may be about three milliseconds, providing a total uniformly consistent elapsed time of four milliseconds from the time an energizing potential is applied to the solenoid until the contacts are fully separated. Zero current is then anticipated by four milliseconds, and the tripping potential applied at an instant to cause the contacts to separate at the moment of zero current.

The circuit of the invention has a number of functions: it provides for the detection of a fault, and keeps the breaker contacts closed after the fault for a predetermined time to attain selectivity. In providing overload protection, when the overload continues for a certain length of time, the breaker opens to prevent damage. In addition, the control circuit will open each of the three phases of the three phase line at its respective zero current regardless of whether the fault is three phase or single phase. The circuit of the instant invention also provides for correct operation independent of the degree of asymmetry of the fault current and independent of the direction of flow of direct current components in the line; the contacts always open at or near zero current of the particular phase. Furthermore, after a breaker is given a signal to open, or in other words, after a circuit is closed or energized which would normally result in the opening of the breaker contacts in a certain conductor, if the current in that conductor suddenly changes its time phase either due to opening of the conductor carrying some other phase, or as a result of the fault changing from a high resistance to a low resistance fault, the timing is adjusted, in a manner which will be more fully set forth hereinafter, so that the contacts still break at substantially zero current.

In summary, the apparatus of the instant invention includes but is not limited to a current transformer in each conductor of a three phase line, each of the transformers having three secondaries. One secondary of each transformer has its output rectified to provide a direct current for charging the capacitor of an R-C circuit of adjustable time constant, and when any capacitor is charged to a predetermined value as a result of a persistent fault current, a related transistor is triggered to ready the control circuit for the operation of breakers in all three of the conductors. An additional secondary of each transformer has connected thereto means for obtaining a direct current component and an alternating current component. The alternating current component is shifted in phase a predetermined amount, for example substantially 90 degrees, and applied to a wave squaring circuit, the output of which is differentiated to provide sharp pulses which occur at substantially the crest points of the alternations of current in the line. Depending upon the direction of the direct current flow in the line, these pulses selectively trigger one of a pair of parallel-connected controlled rectifiers selectively in accordance with the turning on or turning off of one of two transistors operatively connected to the third secondary of the transformer to be forward biased or reverse biased as a result of waveform asymmetries depending upon the direction of flow of the direct current in the line. If the line current contains no direct current, small alternating current voltages are just sufficient to render the transistors conductive when pulsed output is applied across the collector emitter paths thereof. Either controlled rectifier when turned on provides for the application of a direct current voltage to a further transistor to trigger the same, the application of the direct current voltage starting at the crest of either the positive alternation or the negative alternation depending upon the direction of the direct current flow in the line or conductor. The triggering of the further transistor sets in operation a circuit to calculate or measure a time interval which is a function of the ratio of the direct current in the line and the alternating current in the line and to apply the potential to the tripping solenoid of the circuit breaker at the conclusion of this time interval, and thereby result in the energization of the solenoid at a proper moment to break the line at true zero current. An additional portion of the circuit provides that, should the current in the particular phase suddenly change in value and phase, as it might for example as a result of a high impedance fault suddenly changing into a low impedance fault, then a delay circuit operates to further delay the energization of the tripping solenoid a proper amount of time so that for the particular phase the circuit is still broken at substantially the instant of zero current.

Accordingly, a primary object of the invention is to provide a new and improved control circuit for a multiphase circuit breaker in which a conductor for each phase is individually broken at the proper time to insure breaking at substantially zero current for that particular phase.

Another object is to provide a new and improved control circuit for an alternating current circuit breaker in which the presence of a direct current component in the line is accounted for in controlling the time of interruption of the circuit.

Another object is to provide a new and improved control circuit in which a fault in any one phase of a three phase line results in the breaking of all three phases.

A further object is to provide a new and improved method of breaking a conductor carrying both direct and alternating currents at true zero current.

These and other objects and advantages will appear more clearly hereinafter when the attached drawings are read in connection with the accompanying specification, in which.

Figure 1:
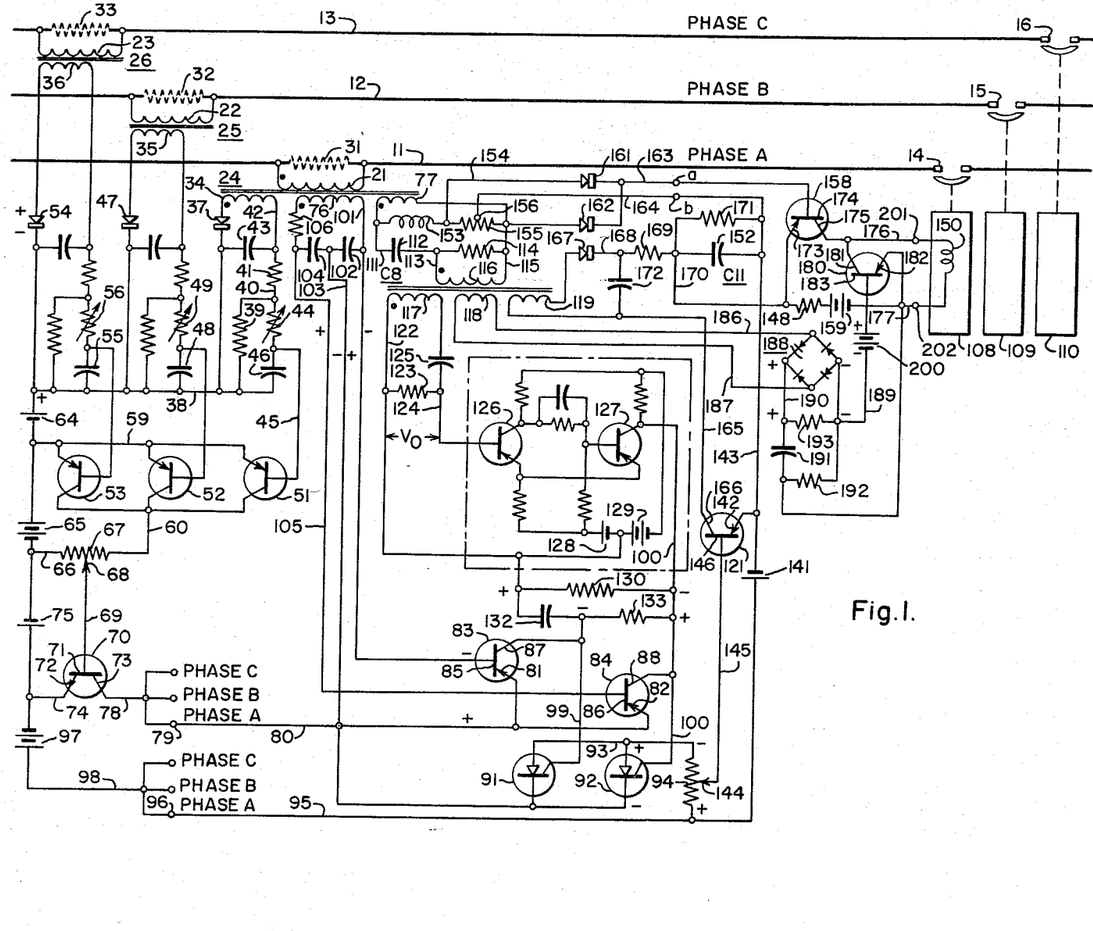
FIG. 1 is a schematic electrical circuit diagram of the invention.

Referring now in particular to FIG. 1 of the drawings, there are shown lines 11, 12 and 13 of a three phase circuit, the conductors 11, 12 and 13 having breaker contacts 14, 15 and 16 of circuit breakers generally designated 108, 109 and 110 respectively in circuit therein respectively, the circuits of conductors 11, 12 and 13 being called herein the protected circuits, and the conductors 11, 12 and 13 having the primaries 21, 22, and 23 respectively of three transformers generally designated 24, 25 and 26 respectively connected in series therein. It is seen from the drawing that the primaries 21, 22 and 23 have connected thereacross resistors 31, 32 and 33 respectively. These resistors 31, 32 and 33 may be either the resistances of the circuit breaker or combinations of external resistors and breaker resistances. The transformers 24, 25 and 26 have corresponding secondary windings 34, 35 and 36. The winding 34 has connected thereacross, in series in the order named, rectifier 37, lead 38, resistor 39, lead 40, resistor 41 and lead 42. Connected between leads 38 and 42 is in the capacitor 43. Connected in shunt with the aforementioned resistor 39 are series-connected variable resistor 44, lead 45 and capacitor 46.

The function of this portion of the circuit including elements 34 to 46 inclusive is to rectify the output of the secondary winding 34 and use the rectified output to charge the capacitor 46, the adjustable resistor 44 varying the charging rate of capacitor 46, the voltage developed on the lead 45 being utilized as will be seen hereinafter to control the conductivity of a transistor 51. In like manner, the output of the secondary 35 of transformer 25 is rectified at 47 and utilized to charge the capacitor 48, the voltage on capacitor 48 controlling the conductivity of transistor 52. The variable resistor 49 controls the charging time of capacitor 48. In a similar manner, the secondary 36 of transformer generally designated 26 has the output thereof rectified at rectifier 54 to charge the capacitor 55 through the variable resistor 56, the voltage across the capacitor 55 controlling the operation of the transistor 53.

The transistors 51, 52 and 53 may be PNP transistors as shown having their emitters connected together to lead 59, having their collectors connected together to lead 60, the base of the transistor 51 being connected by way of the above-mentioned lead 45 to the junction between variable resistor 44 and capacitor 46, the base of transistor 52 being connected by the lead means shown to the junction between capacitor 48 and variable resistor 49, and the base of transistor 53 being connected by the lead means shown to the junction between capacitor 55 and variable resistor 56. It is seen that one terminal of all of the capacitors 46, 48 and 55 is connected to the aforementioned lead 38, which is connected by way of biasing battery 64 to the aforementioned lead 59 and thence to all of the emitters of transistors 51, 52 and 53. The aforementioned lead 59 is also connected by way of the collector energizing battery 65, lead 66 and potentiometer 67 to the aforementioned lead 60. The arm 68 of potentiometer 67 is connected to the lead 69.

In operation, transistors 51, 52 and 53 are each normally biased to a nonconducting condition by battery 64. It will be noted that in accordance with the polarities of rectifiers 37, 47 and 54, the capacitors 46, 48 and 55 are charged to polarities so that the voltages produced across the charged capacitors are in circuit with the battery 64 and are opposite in polarity. While normal line currents exist, capacitors 46, 48 and 55 are not charged to potentials such as to exceed the biasing potential. However, when a fault occurs in any of the circuits of conductors 11, 12 and 13, the abnormal energization of any one of the secondaries 34, 35 or 36 as a result of a fault causes charging current to flow into the respective capacitor and after a time determined by the size of the capacitor, the turns on the secondary, the value of the variable resistor, and other factors, a sufficient voltage is produced to overcome the biasing voltage of battery 64 and cause one of the transistors 51, 52 or 53 to conduct. This causes a potential difference to exist across the aforementioned potentiometer 67 as current flows therethrough, this potential drop across potentiometer 67 being of a polarity to make the aforementioned lead 66 negative with respect to the aforementioned lead 69. The R–C circuits 44–46, 49–48, and 56–55 are in effect delay devices, and the transistors 51, 52 and 53 are in effect isolating devices.

There is shown at 70 an additional transistor, which constitutes a switch, having a base 71, emitter 72 and collector 73. The base 71 is connected to the aforementioned lead 69 and the emitter 72 is connected by way of lead 74 and bias battery 75 to the aforementioned lead 66. It is seen that transistor 70 is of the NPN type and accordingly the battery 75 has its positive terminal connected to the aforementioned lead 74, the battery 75 normally biasing the emitter 72 in a reverse direction and causing the transistor 70 to be nonconductive. Only when the potential developed across the aforementioned potentiometer 67 resulting from the energization of any one of the transistors 51, 52 and 53 overcomes the bias of battery 75 and makes the emitter 72 negative with respect to the base 71 does the transistor 70 become conductive.

As stated hereinbefore, the circuit provides means for breaking all three phases of a three phase line. For simplicity of illustration and description, only the complete circuit for controlling breaker 108 and causing the breaker contacts 14 in conductor 11 to open is shown, this being phase A, but it should be understood that the transformer 25 in phase B has an additional pair of secondaries corresponding to the secondaries 76 and 77 of the transformer generally designated 24, and that the transformer generally designated 26 with its primary in conductor 13 of phase C also has two secondaries in addition to secondary 36, the two additional secondaries corresponding to secondaries 76 and 77 of transformer 24. All three secondaries of transformer 25 are connected in the circuit which governs the operation of breaker 109, and all three secondaries of transformer 26 are connected in the circuit which governs the operation of breaker 110.

The output of the aforementioned transistor 70 is supplied from collector 73 by way of lead 78 to circuits for controlling the breakers of all three phases. It should be understood that circuits for controlling the breakers of phase B and phase C may be similar to the circuit of phase A, and all are connected at the indicated connecting points to lead 78. Lead 78 is connected by way of terminal 79 and lead 80 to the emitters 81 and 82 of a pair of PNP transistors 83 and 84 respectively, having bases 85 and 86 respectively and collectors 87 and 88 respectively.

The aforementioned lead 80 is also connected by way of the anode-cathode paths of a pair of similar parallel-connected controlled rectifiers 91 and 92, lead 93, potentiometer 94, lead 95, terminal 96, lead 98 and collector energizing battery 97 to the aforementioned lead 74 and emitter 72. Potentiometer 94 has arm 144. The controlled rectifiers 91 and 92 may be of a type known in the trade as a silicon controlled rectifier. When either of the controlled rectifiers 91 or 92 becomes conductive while transistor 70 is conductive, current flow from battery 97 through potentiometer 94 makes arm 144 negative with respect to lead 95. It is seen that the terminal 96 and lead 98 have two other terminals directly connected thereto for providing leads to circuits for controlling breakers 109 and 110 in phases B and C. The aforementioned controlled rectifier 91 has the control electrode thereof connected by way of lead 99 to the collector 87 of transistor 83, whereas the control electrode of controlled rectifier 92 is connected by way of lead 100 to the collector 88 of transistor 84.

As previously stated, the aforementioned transformer generally designated 24 has a secondary 76. The secondary 76 has connected thereacross, in series in the order named, lead 101, capacitor 102, lead 103, capacitor 104, lead 105 and resistor 106. Lead 101 is connected to the aforementioned base 85 of transistor 83. Lead 103 is connected to and may be integral with the aforementioned lead 80, whereas lead 105 is connected to the aforementioned base 86 of transistor 84.

The purpose of the secondary 76 and associated components is to bias the two transistors 83 and 84 selectively to render them selectively conductive in accordance with the direction of the flow of the direct current component in the line 11. Because there is a component of direct current in the line 11, the flux in the transformer core of transformer 24 will be asymmetrical over the alternating current cycle, and the waveform of the transient current signal in the secondary winding 76 will also be asymmetrical. Current flows through resistor 106 into the series-connected capacitors 104 and 102 and, depending upon the direction of direct current flow in line 11, there develop residual charges on these capacitors as a result of the difference in effective areas of the positive and negative alternations in the secondary, with the result that if the direct current in line 11 flows in one direction capacitor 102 may be charged in a direction which makes lead 101 positive with respect to the center tap lead 103, whereas if the direct current flow is reversed in direction in conductor 11, the capacitor 104 may be so charged that lead 105 is made positive with respect to the center tap lead 103. In practice, the transistor 83 is rendered conductive when lead 101 is negative with respect to the center tap lead 103, because, as shown, the transistor 83 is of the PNP variety and a negative lead 101 tends to make the base negative with respect to the emitter 81 and bias the emitter 81 in a forward direction, whereas the transistor 84 is rendered conductive when lead 105 is negative with respect to center-tap lead 103, the transistor 84 also being of the PNP variety as shown. The polarities shown are chosen as those which forward bias transistor 83, an assumed condition in the description of the operation of the circuit to follow.

As previously stated, the transformer generally designated 24 has a third secondary 77. A circuit arrangement is connected to secondary 77 for obtaining a direct current signal proportional in amplitude to the direct current component in the line, and an alternating current signal proportional in amplitude to the alternating current in the line. This is accomplished by providing two parallel branches across the output of secondary 77. One branch has an inductor 153 in series with a resistor 155. The other branch has a capacitor 112 in series with a resistor 114. The inductive reactance of 153 is sufficiently large so that essentially only direct current component flows in resistor 155. Since the capacitor 112 blocks off the direct current, only alternating current component flows in resistor 114. The alternating current signal across resistor 114 is applied to primary 116, and the signal from secondary 119 is then rectified to direct current so that it may be more easily "compared" in amplitude with the direct current signal representing the direct current component. Both signals representing both components vary in amplitude in accordance with variations in the voltage induced in secondary 77. The capacitor 112 and resistor 114 also comprise a phase shifting network which is provided for reasons which will be explained hereinafter. Connected across the resistor 114 is the primary 116 of a transformer having three secondaries 117, 118 and 119. For reasons which will become more clearly apparent hereinafter, it is desirable to develop a direct current voltage drop across potentiometer 94 for gating an additional transistor 121 at a precise time with respect to the crest of that alternation of the alternating current voltage in conductor 11 which is of the same polarity as the direct current component in line 11. To this end, the terminals of the aforementioned secondary 117 are connected to a phase shifting network comprising lead 122, resistor 123, lead 124 and capacitor 125. The output of the aforementioned phase shifting network is applied as an input to a wave squaring circuit, in this case a Schmitt trigger circuit, comprising transistors 126 and 127. The aforementioned lead 124 is connected to the base of the transistor 126 and the aforementioned lead 122 is connected to the junction between a biasing battery 128 and a collector energizing battery 129 of the Schmitt trigger circuit. The aforementioned lead 122 is also connected by way of load resistor 130 to lead 100 and thence to the collector of the aforementioned transistor 127 of the Schmitt trigger circuit.

The operation of a Schmitt trigger circuit is well-known and need not be described in detail. Reference may be had to Department of the Army Technical Manual TM11–690, published March, 1959, page 210, for a circuit diagram of the Schmitt trigger circuit and for an output wave form drawn to the same time scale as the input wave form. Description of the operation of the circuit may be found on page 208. It is seen from a study of the wave form that there is a phase delay of approximately and not exceeding 45 degrees between zero voltage of a negative going alteration of the alternating current input of the trigger circuit and the negative going slope of the square wave output. It should be noted that the absolute magnitude of the output varies between a minimum value and a maximum value corresponding substantially to the value of the collector voltage.

The voltage developed across the aforementioned load resistor 130 is applied to a differentiating network comprising the series-connected capacitor 132 and resistor 133, having the aforementioned lead 99 connected to the junction therebetween, and as aforementioned, lead 99 goes to the collector 87 of transistor 83.

Figure 2:
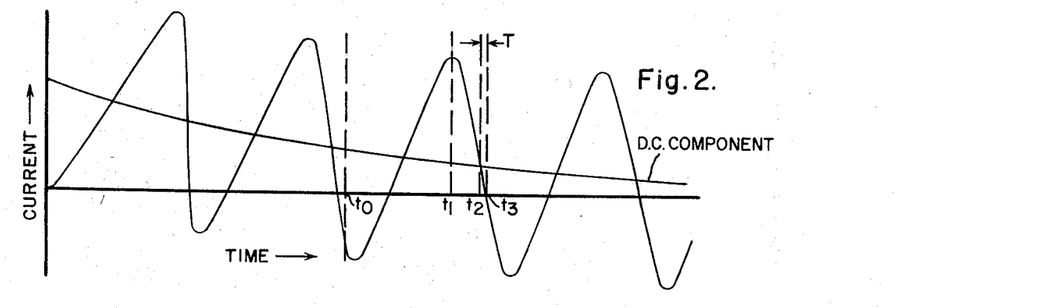
FIGS. 2, 3, 4 and 5 are graphs illustrating the operation of the apparatus of FIG. 1.

Particular reference is made now to FIG. 2. As previously stated, one of the objects of the invention is to provide an automatic circuit for opening the circuit breaker in an alternating current line having a direct current component. FIG. 2 shows an illustrative graph of an alternating current superimposed upon a decaying direct current component in, for example, the conductor 11. The time scale of the graph of FIG. 2 may be considered as simplified or idealized. The time interval between instants $t_1$ and $t_2$ may correspond to ½ alternation. In FIG. 2, the time $t_0$ may occur at any instant in a substantial portion of the alternating current cycle. The time $t_0$ represents the time when the transistor 70 is turned on by one of the transistors 51, 52 or 53. The turning on of transistor 70 does not of itself cause the appearance of a direct current voltage across the potentiometer 94 to trigger the aforementioned transistor 121; the potentiometer 94 is energized and has a voltage drop developed thereacross only when one of the controlled rectifier switches 91 or 92 is closed, and these controlled rectifier switches are selectively closed when the transistors 83 and 84 are selectively energized, the selective energization of the transistors 83 and 84 being jointly under the control of bias from capacitors 102 and 104 connected to secondary 76, and under the control of the pulse output of the differentiator including capacitor 132 and resistor 133. The pulse output of the differentiator limits the time of firing of the controlled rectifiers 91 and 92 to instants corresponding to the peaks of the line current. The bias voltage of capacitors 102 and 104 selects the peak in the same direction as that of the direct current component.

It will be understood that after each operation of the breaker circuit, one or both of the controlled rectifiers 91 and 92 must be "reset," that is, turned off and restored to a non-conductive condition. This can be accomplished by momentarily applying a potential of reversed polarity across the controlled rectifiers, and any suitable reset circuit, not shown, may be provided for this purpose.

Figure 3:
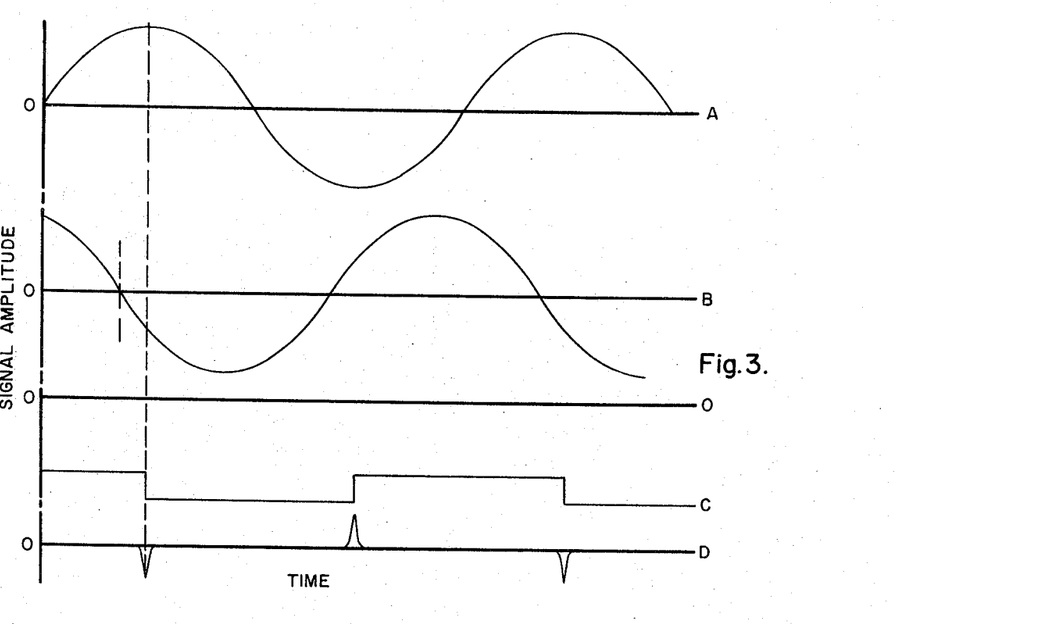

In FIG. 2, the time $t_0$ represents the moment when transistor 70 is turned on. The time $t_1$ represents the crest of that alternation of the alternating current following which the circuit is to be broken when the total current in the line, that is, the sum of the direct current and the alternating current reaches or closely approaches zero. To this end, the alternating current component from the aforementioned secondary 77 is advanced in phase by the phase shifting device 112–114 and also advanced in phase by the phase shifting device 123–125, the total advance in phase exceeding 90 degrees to allow for an aforementioned phase delay in the output of the Schmitt trigger. These relationships are shown in FIG. 3, to which particular reference is made. Curve A represents the line current, curve B the input to the Schmitt trigger, curve C the output of the Schmitt trigger with respect to the zero axis shown, and curve D the output of the differentiator. Consider the case shown in FIGURE 2 wherein the direct current component is positive. The circuit arrangement should be such that current flow in rheostat 94 should be turned on at an instant corresponding to the first positive crest of line current after the time $t_0$. This time instant is shown as $t_1$ in FIG. 2. The positive direction of current flow in line 11 is from left to right. With positive direct current, the capacitors 102 and 104 will be charged with a polarity as shown in FIGURE 1, i.e., the terminal at the left of the capacitors is at a higher potential with respect to the terminal at the right. It is seen from a study of FIG. 3 that by arrangement of the circuit, the Schmitt trigger output can undergo a negative change at substantially the instant $t_1$ resulting in a negative pulse output of the differentiator 132–133. This negative pulse is applied to the collector 87 of transistor 83 at the moment the transistor 83 is forward biased from the capacitor 102 in a manner to render the transistor 83 conductive, thereby turning on the controlled rectifier 92. The current path for turning on controlled rectifier 92 when transistor 83 is forward biased and the left-hand end of differentiator resistor 133 is negative with respect to the right-hand end is as follows: from resistor 133 to lead 99 to collector 87 to emitter 81 to lead 80 to the cathode of controlled rectifier 92 to the control element to lead 100 and resistor 133. When element 92 is turned on, it provides a path through transistor 70 from battery 97 for causing a voltage drop across the potentiometer 94.

The voltage across potentiometer 94 is applied by way of lead 95 and battery 141 to the emitter 142 of switch transistor 121, the emitter 142 having lead 143 connected thereto, the arm 144 of potentiometer 94 being connected by lead 145 to the base 146 of transistor 121.

The result of this aforedescribed circuit operation is that the transistor 121 is turned on at substantially the time $t_1$ corresponding to the crest of the alternation shown in FIG. 2. It has been assumed in describing the invention that the alternating current is a 60 cycle current, and accordingly each alternation exists for approximately 8 milliseconds, and as previously stated, the total delays in the circuit including the time it takes the breaker contacts to travel from a "make" position to a fully "open" position, the time it takes current and flux to build up in the solenoid 150, latch travel, etc., are approximately 4 milliseconds. If there were no direct current component of current in the line 11, zero current would occur in the line at a time $t_2$ approximately 4 milliseconds after time $t_1$. However, since there is a direct current component, zero current in the line occurs at some other instant $t_3$ approximately T milliseconds after the time $t_2$; the time $t_1$ is $(4+T)$ milliseconds before zero current. The time interval T is a function of the relative magnitudes of the D.-C. and A.-C. components of the fault current in line 11. From FIG. 2, it is seen that at time $t_2$ the A.-C. current is equal to the D.-C. current, or $I_{\text{D.-C.}} = \sqrt{2} I_{\text{A.-C.}} \sin \omega T$;

$$\therefore T = \frac{1}{\omega} \sin^{-1} \frac{I_{d.-c.}}{\sqrt{2} I_{a.-c.}} \cong \frac{1}{\sqrt{2}\omega} \frac{I_{d.-c.}}{I_{a.-c.}}$$

Since it is desired to apply an energizing potential to the trip solenoid 150 after transistor 121 is turned on, but only four milliseconds before the zero current, in accordance with the exemplary four millisecond inherent time delay in the breaker, it is necessary to introduce another delay of T milliseconds before turning on a further transistor 158 which actually controls application of the energizing potential from battery 159 to the trip solenoid. To this end, the signal corresponding to the direct current component and the signal corresponding to the alternating current component, both obtained from secondary 77, are "compared" in a circuit to be described, and the time it takes capacitor 152 to be charged by the A.-C. signal after rectification to a voltage which will cancel out the D.-C. signal and turn on transistor 158 is proportional to the ratio of the magnitudes of the D.-C. to A.-C. components, and will correspond to the time T no matter what the absolute values of $I_{\text{A.-C.}}$ and $I_{\text{D.-C.}}$ are. The charge across capacitor 152 controls the energization of the aforementioned transistor 158 which as previously explained controls the energization of the solenoid 150.

Particular reference is made to FIG. 1 where it is seen that across the aforementioned leads 111 and 115 connected to the terminals of secondary 77 there are connected in series the inductor 153, lead 154 and voltage dropping resistor 155 having mid tap 156. Lead 154 is connected by way of rectifier 161 to lead 163, and lead 115 is connected by way of rectifier 162 to lead 163, and then to terminal "a." The mid tap 156 is connected via lead 164 to terminal "b." The potential of terminal "a" is always positive with respect to terminal "b," irrespective of the direction of flow of direct current in resistor 155. As mentioned before, only the component of direct current flows in resistor 155, the voltage difference between "a" and "b" is proportional to the magnitude of $I_{\text{D.C.}}$, and "a" is always at positive potential with respect to "b."

The aforementioned secondary 119 of the transformer having primary 116 has one terminal thereof connected by way of lead 165 to the collector 166 of the aforementioned transistor 121, and the other terminal of the secondary 119 is connected by way of rectifier 167, lead 168, resistor 169, lead 170, resistor 171 and lead 143 to the aforementioned emitter 142 of transistor 121. The resistor 171 has capacitor 152 connected thereacross, and capacitor 172 is connected from the aforementioned lead 168 to the aforementioned lead 165, as shown. It is noted that lead 170 is connected to the emitter 173 of the aforementioned transistor 158, that the aforementioned lead 163 is connected to the base 174 of the aforementioned transistor 158, and that the collector 175 of the aforementioned transistor 158 is connected by way of lead 176 to one terminal of the aforementioned winding 150, and that the other terminal of the aforementioned winding 150 is connected by way of lead 177 to the aforementioned energizing source of potential 159 which supplies energizing potential for the transistor 158 and also an energizing current for the coil 150 when the transistor 158 is rendered conductive. Resistor 148 is a current limiting resistor of small resistance value.

In the operation of the aforedescribed circuit for energizing the transistor 158 after an additional time delay T which corresponds to the ratio of the magnitude of the direct current component to the magnitude of the alternating current component irrespective of the absolute magnitudes of these components, it is noted that a direct current potential V$ab$ exists across circuit points $a$–$b$, that this potential V$ab$ is proportional to the D.-C. component of line current, and that the polarity of V$ab$ is such as to reverse bias the emitter of transistor 158 and render transistor 158 non-conductive.

The capacitor 172 is normally charged through rectifier 167 to substantially the voltage across secondary 119 in the absence of the closing of the circuit of leads 165–143 through transistor 121. As mentioned before, only alternating current component of line current flows in resistor 114. The voltage across the primary winding 116, and therefore the voltage output of the secondary winding 119, is proportional to the alternating current component of line current. The voltage across capacitor 172 is then proportional to the alternating current in the line 11. Capacitor 152 is normally "bled" to zero charge by resistor 171. When the transistor 121 is switched on, the charge across the aforementioned capacitor 172, because of the circuit arrangement, flows into capacitor 152 until the voltage across capacitor 152 equals V$ab$. At this time or point, the bias of transistor 158 is zero. The voltage across capacitor 152 builds up slightly greater, applying a forward bias to emitter 173. By choice of R and C values, it can readily be provided that transistor 158 is switched on a time T after transistor 121 is switched on, the time T corresponding to the ratio of the magnitudes of the direct current component to the alternating current component. The time T is a measure of the ratio of $I_{D.C.}$ to $I_{A.C.}$. By using only the linear portion of the charging characteristic curve of the capacitor 152, the voltage $V_{c152}$ at any time with various fault current in line 11 is proportional to the product of the voltage across the capacitor 172, $V_{c172}$, and the time duration of charging $t$.

$$V_{c152} \propto V_{c172} t$$

$V_{c172}$ is proportional to $I_{A.C.}$; therefore $$V_{c152} \propto I_{A.C.} t$$

At the instant when $t=T$, $V_{c152}$ is equal to V$ab$, so that $$\text{V}ab \propto I_{A.C.} T$$

V$ab$ is proportional to $I_{D.C.}$; therefore $$I_{D.C.} \propto I_{A.C.} T$$

or, by transposing $$T \propto I_{D.C.}/I_{A.C.}$$

As previously stated, the apparatus of the instant invention is designed to break each phase at substantially zero current.

Figure 4:
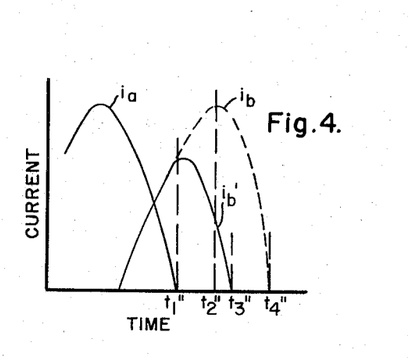

After the first phase (phase A in this case) opens, currents in the other two phases change. Particular reference is made now to FIGURE 4. In FIGURE 4, $i_b$ changed to $i_b'$ when $i_a$ is interrupted. The controlled rectifiers in phase B control circuit (corresponding to controlled rectifiers 91 and 92 in phase A control circuit) will be triggered at time $t_1''$ instead of time $t_2''$. The tripping solenoid of phase B will automatically have potential applied thereto at time $t_1''$ instead of $t_2''$. The breaker contacts will then open at the true current zero $t_3''$ instead of time $t_4''$. Should there be a direct current component present during the above described operation, the delay circuit of transistor 158 will operate substantially as before.

Figure 5:
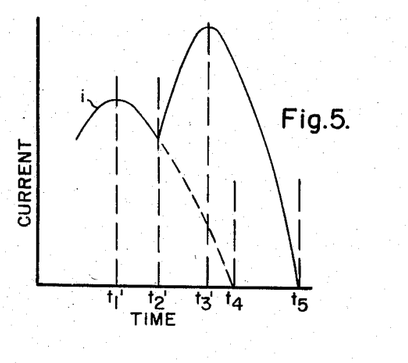

Another condition in which a change in current time phase occurs after the trip coil 150 has potential applied thereto is illustrated in FIGURE 5. In the case shown in FIGURE 5, at instant $t_1'$ corresponding to the crest of the alternation, the tripping solenoid 150 has potential applied thereto due to prolonged overload. The contacts are aimed to open at time $t_4$; however, at instant $t_2'$, the overload or high impedance fault suddenly develops into a short circuit or a low impedance fault. The current suddenly increases and becomes more lagging. If this condition happens, the aim of opening breaker contact at time $t_4$ must be changed to break at time $t_5$. This change is accomplished by transistor 180 and its associated circuitry. The aforementioned transformer secondary 118 is connected by way of leads 186 and 187 to a full wave rectifier 188, the negative terminal of which rectifier is connected by way of lead 189 to bias battery 200 to the base 183. The positive output terminal of the rectifier 188 is connected by way of lead 190, capacitor 191 and lead 177 to the emitter 182. Collector 181 is connected to lead 176. Leads 189 and 177 have the resistor 192 connected thereacross, and leads 189 and 190 have the resistor 193 connected thereacross. The time constant of the RC circuit consisting of capacitor 191 and resistor 192 is small (for example, in the order of 1 millisecond) when the magnitude of the line current is increasing. Current flow across the resistor 192 is from left to right. The emitter of transistor 180 is reversed biased by battery 200 and transistor 180 is non-conductive if the line current does not increase suddenly. In the particular condition shown by FIGURE 5, i.e., the line current suddenly increases at time $t_2'$, current flows through resistor 192 to increase the charge on the capacitor 191; the voltage drop across resistor 192 is of a polarity to oppose the bias potential from battery 200 and to bias the transistor 180 into a conductive condition, and this short-circuits the winding 150. The plunger of the relay falls back to its starting position. Near time $t_3'$, the charging current of capacitor 191 falls to near zero, the emitter 182 again becomes reverse biased, and the transistor 180 ceases to be conductive, removing the short circuit and allowing the solenoid to be energized from battery 159, aiming to break the circuit at approximately time $t_5$.

Figures 6, 7:
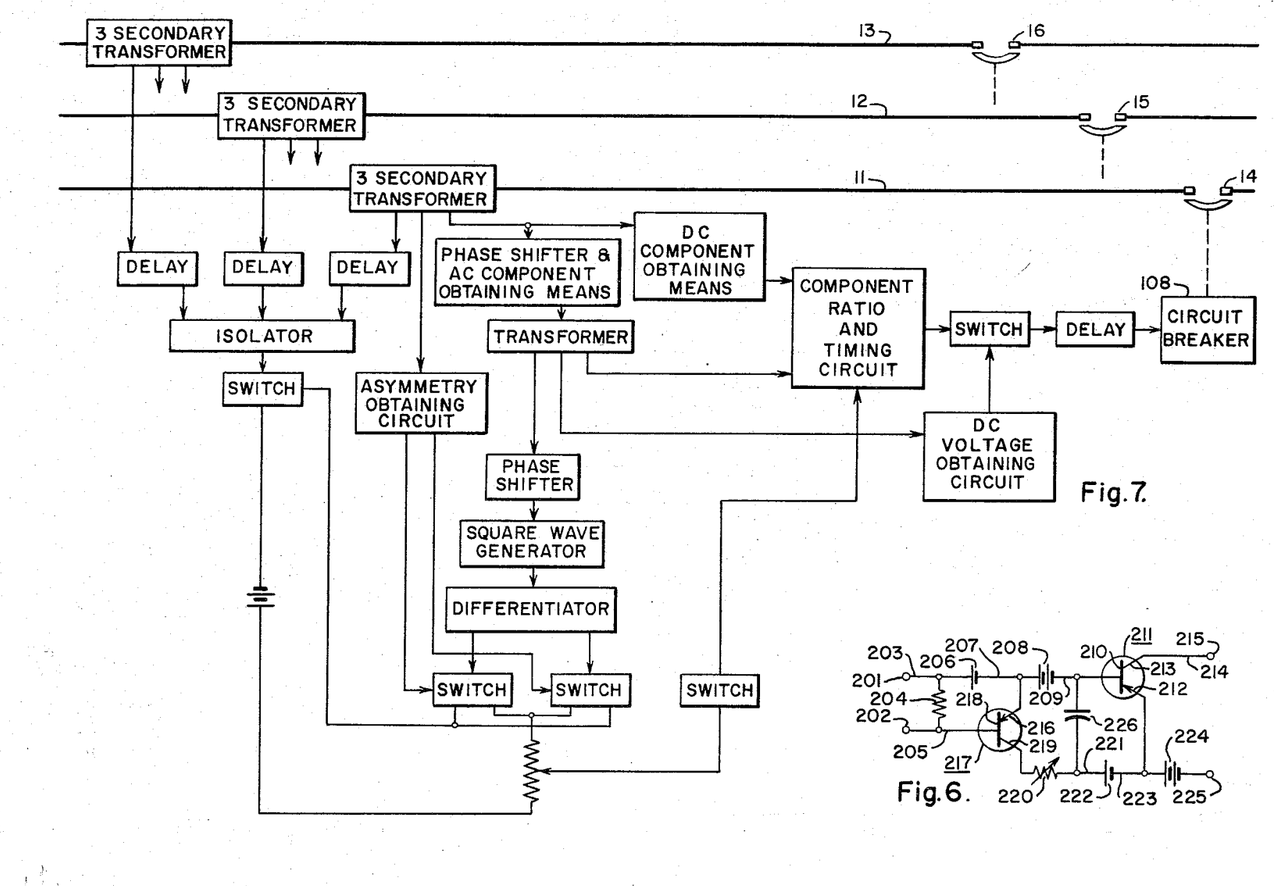
FIG. 6 is a schematic circuit diagram of a delay circuit which may be inserted in the circuit of FIG. 1 when the circuit breaker has an inherent time of operation of less than one quarter cycle.
FIG. 7 is a block diagram of the apparatus of FIGS. 1 and 6.

Particular reference is made now to FIG. 7, a block diagram of the apparatus of FIG. 1.

The block diagram of FIG. 7 will first be explained with reference to the graph of FIG. 2. As previously stated, in order to open the breaker contacts at time $t_3$ corresponding to true zero current in the line, the circuit must:

A.—*Determine that a fault condition requiring opening of the breaker contacts exists*

To accomplish this, one secondary 34 of the three secondary transformer in line 11 has its output rectified and used to charge a capacitor. Rectifier 37 and capacitor 46 are included in the block entitled "Delay." When the capacitor is charged to a certain voltage, transistor 51 is rendered conductive. Transistor 51 is included in the block entitled "Isolator." The time delay renders the circuit unresponsive to transients and momentary variations in line current. When transistor 51 is rendered conductive, it turns on transistor 70, which is included in the adjacent block labeled "Switch." Transistor 70 may be turned on at time $t_0$ in FIG. 2, that is, transistor 70 may be turned on during either the positive or negative alternation of the alternating current in line 11, irrespective of whether the direct current component is positive or negative. The turning on of transistor 70 "readies" the circuit to effect an opening of the circuit breaker contacts.

B.—*Determine whether the direct current component in line 11 is positive or negative and effect a switching operation at the crest of the alternation corresponding in polarity to the polarity of the direct current component*

To accomplish this, two similar blocks labelled "Switch" are provided, disposed side by side in the block diagram, one of which may be closed at the crest of a negative alternation, the other of which may be closed at the crest of a positive alternation. The left-hand switch as seen in FIG. 7 includes transistor 83 and controlled rectifier 92; the right-hand switch as seen in FIG. 7 includes transistor 84 and controlled rectifier 91. These switches must be selectively turned on depending upon the polarity of the direct current component. To this end, an "Asymmetry Obtaining Circuit" is provided, including secondary 76, resistor 106, and dual capacitors 104 and 102, which as aforeexplained, selectively bias one or the other of the transistors 83 or 84 in a condition to conduct a pulse from the "Differentiator." It will be understood that the "Differentiator," which includes capacitor 132 and resistor 133, supplies pulses (as shown in FIG. 3) to both transistors 83 and 84, but that only the properly or forward biased transistor is rendered conductive.

As previously stated, a switching operation must be effected at the crest of the selected alternation. To this end, secondary 77 of the transformer in line 11 has connected thereto a phase shifter including capacitor 112 and resistor 114. These are included in the block entitled "Phase Shifter and A.C. Component Obtaining Means." Included in the adjacent block labelled "Transformer" are primary 116 energized from the phase shifter, and secondaries 117, 118, and 119. The output of secondary 117 after being shifted in phase by the phase shifting network including capacitor 125 and resistor 123, which are included in the adjacent block labelled "Phase Shifter," is applied to a square wave generator including transistors 126 and 127 connected in a Schmitt trigger circuit, these being included in the block labelled "Square Wave Generator," which supplies a signal to the aforementioned differentiator. The various aforementioned phase shifts and delays, FIGS. 1 and 3, result in turning on one of the transistors 83 or 84 at the crest of the proper alternation, the pulse from the differentiator triggering on the associated controlled rectifier, and current flowing through the associated controlled rectifier causes a voltage drop across the shown potentiometer, which voltage turns on transistor 121 at time $t_1$ in FIG. 2, thereby effecting the necessary switching operation, transistor 121 being included in the block labelled "Switch" and connected between the potentiometer and the "Component Ratio & Timing Circuit."

C.—*Compute time "T" and delay the application of potential to the coil 150 of the circuit breaker by this time interval*

As previously stated, there is an inherent time delay of 4 milliseconds between the application of potential to the coil 150 and the opening of the breaker contacts. Four milliseconds corresponds to the time of one-half alternation for 60 cycle current, and if there were no direct current component in line 11, it would be desirable to operate the "Switch" (transistor 158) between the circuit breaker 108 and the "Component Ratio and Timing Circuit" immediately upon the operation of the transistor switch 121, both of these being operated at time $t_1$ in FIG. 2. This would cause the contacts to open at time $t_2$ corresponding to zero current.

However, as seen in FIG. 2, the presence of a direct current component causes zero current to occur at a later time $t_3$, the time difference between $t_2$ and $t_3$ being designated "T." Accordingly, the switch of transistor 158 must be closed to energize coil 150 at a time $t_1+T$.

To accomplish this, two signals are obtained proportional to the direct current and alternating current components respectively. The block labelled "D.C. Component Obtaining Means" includes the series-connected inductor 153 and center-tapped resistor 155 connected across secondary 77, and rectifiers 161 and 162, developing the direct current signal between leads 163 and 164, FIG. 1. This signal is a voltage which reverse-biases transistor 158.

The "Component Ratio and Timing Circuit" also includes rectifier 167 and capacitors 152 and 172, these being connected to the aforementioned transformer secondary 119. Capacitor 152 is charged at a rate determined by the magnitude of the alternating current component, and the time it takes capacitor 152 to charge to a voltage which overcomes and exceeds the reverse bias voltage between leads 163 and 164 gives the delay "T" in turning on transistor switch 158. Capacitor 152 does not begin to charge until transistor 121 is rendered conductive thereby closing the necessary circuit. The block labelled "Component Ratio and Timing Circuit" also includes bleeder resistor 171, provided for purposes hereinbefore explained.

The next adjacent block labelled "Switch" includes transistor 158, current limiting resistor 148, source of potential 159, and transistor 180 which, under certain conditions which need not be explained here, shorts out the coil 150 for a time interval to delay the application of potential thereto. When switch transistor 158 is rendered conductive, in accordance with the above explanation, potential is applied to coil 150 at a time $t_1+T$, and after 4 milliseconds the contacts open at zero current time $t_3$, FIG. 2.

The block labelled "D.C. Voltage Obtaining Circuit" includes full wave rectifier 188 energized from aforementioned secondary 118, resistors 192 and 193 and capacitor 191. This circuit is used when a high impedance fault suddenly becomes a short circuit or other low impedance fault, as illustrated by FIG. 5. Capacitor 191 is charged and remains charged long enough to introduce the necessary delay to open the contacts at $t_5$. The charge on capacitor 191 maintains transistor 180 conductive thereby short-circuiting the coil 150 for a time interval.

The block labelled "Delay" interposed between the "Circuit Breaker" and the last mentioned switch may be dispensed with where the breaker has an inherent time delay of four milliseconds and the alternating current is 60 cycles. The block labelled "Delay" may include the circuit of FIG. 6, which is needed when the inherent time delay in the circuit breaker is less than ¼ cycle.

In one preliminary design of a 1600 ampere breaker utilizing the timing control circuit of the instant invention, the volume of the apparatus was only ⅐ that of a conventional circuit breaker accomplishing the same result.

The invention includes the use of adjustable resistors at any point in the circuit instead of the fixed resistors as shown, to provide for proper establishment of the desired time relationships.

Whereas NPN or PNP transistors have been shown at certain points in the circuit, it should be understood that other types may be used, if desired, suitable rearrangement of the circuit being made in a manner which will be apparent to one skilled in the art.

For simplicity of illustration only, the reset circuits for the controlled rectifiers 91 and 92 have been omitted. As will be readily understood by those skilled in the art, once conduction starts in either of these controlled rectifiers, in order to stop conduction it is necessary to either reduce the voltage thereacross to zero or momentarily reverse the polarity, and this is contemplated, any suitable circuit being provided for this purpose.

Whereas for convenience of illustration, only one secondary has been shown on transformers 25 and 26, it should be understood that each of these transformers has three secondaries similar to the secondaries of transformer 24.

Particular reference is made now to FIG. 6. In the embodiment previously described it was stated by way of example that the inherent invariable time delay between the application of an energizing potential to tripping solenoid 150 and the complete opening of the breaker contact at 14 was 4 milliseconds. It has been noted that 4 milliseconds corresponds substantially to the time duration of ½ of 1 alternation of a 60 cycle alternating current. This inherent time delay represents the most desirable condition of operation; however, the apparatus is adapted to use a circuit breaker having, for example, a time delay of two milliseconds between the application of a voltage to the solenoid and the opening of the contacts. In such a case it is necessary to introduce an additional time delay so that while transistor 121 is triggered on at the crest of that alternation which precedes the opening of the contacts, the complete time delay in the circuit corresponds to 4 milliseconds with a resulting break at zero current. To this end the circuit of FIG. 1 may be broken at terminals or contact points 201 and 202 and the time delay circuit of FIG. 6 interposed in the circuit at this position. In FIG. 6, terminal 201 is connected by way of lead 203, biasing battery 206, lead 207, battery 208, and lead 209 to the base 210 of an additional transistor generally designated 211 having an emitter 212 and a collector 213. The collector 213 is connected by way of lead 214 to an output terminal 215, which connects to one end of coil 150. The aforementioned terminal 202 is connected by way of lead 205 to the base 218 of a further transistor 217 having the emitter 216 thereof connected to lead 207. A resistor 204 is connected across leads 203 and 205. The collector 219 of transistor 217 is connected by way of variable resistor 220, lead 221, battery 222, lead 223 and battery 224 to an additional output terminal 225, which is connected to the other end of coil 150. Lead 223 is connected to the aforementioned emitter 212 of transistor 211. Between leads 209 and 221 there is connected a time delay capacitor 226.

In the operation of the circuit of FIG. 6, transistor 217 is normally reverse-biased by bias battery 206, while transistor 211 is normally reverse-biased at the emitter by battery 222, and both of the transistors are normally non-conductive so that no potential is applied from battery 224 to the solenoid 150, it being noted again that the terminals 215 and 225 are connected across the solenoid 150. When a voltage is developed between terminals 201 and 202, a current flows across resistor 204 and the potential drop thereacross is of a polarity to oppose the potential from bias battery 206 and forward bias the emitter 216 causing transistor 217 to become conductive. When transistor 217 becomes conductive, current from battery 208 flows into capacitor 226 through the transistor and the variable resistor 220. After a time interval determined by the R–C constants of 226 and 220, the capacitor is charged to a sufficient potential which is of a polarity to oppose the potential of bias battery 222 and tends to make the emitter 212 positive with respect to the base 210. The transistor 211 then becomes conductive, completing a current path therethrough for current from the battery 224 to energize the solenoid 150. The variable resistor 220 permits adjustment of the time delay.

If the line current contains no direct current, the small alternating current voltages across the capacitors 102 and 104 will be just sufficient to render transistors 83 or 84 conductive when pulsed output is applied across the collector and emitter of transistor 83 or 84.

Whereas the invention has been shown and described with respect to embodiments thereof which give satisfactory results, it would be understood that changes may be made and equivalents substituted without departing from the spirit and scope of the invention.

I claim as my invention:

1. In circuit breaker apparatus for use in an alternating current line having a direct current component therein, in combination, a circuit breaker having contacts in the line, the circuit breaker having an inherent invariable time delay between the application of a predetermined tripping potential thereto and the opening of the contacts, means including phase shift means, square wave generator means, differentiator means, and transistor switching means connected to the line for ascertaining the instant when the alternation corresponding in polarity of the polarity of the direct current component attains its crest amplitude and for producing a signal at said instant, means connected to the line initiated by said signal for measuring the ratio of the amplitudes of the direct current component of the alternating current component, and circuit means including energizing means connecting the ratio measuring means to the circuit breaker.

2. In a control circuit for a circuit breaker for use in a line having an alternating current component and a direct current component, the circuit breaker having a tripping coil and contacts in the line, in combination, means including phase shift means, square wave generator means, differentiator means and transistor switching means connected to the line and responsive to a fault current in the line for obtaining an electrical signal at an instant selected from two timed instants, one of said instants corresponding to the crest of an alternation of positive polarity in the alternating current in the line when the direct current component flows in one direction, the other of said instants corresponding to the crest of an alternation of negative polarity of the alternating current in said line when the direct current component flows in the opposite direction, means connected to the signal obtaining means and to the line for producing a second signal at a variable time interval after the occurrence of the first named signal, the time interval being a function of the ratio of the magnitude of the direct current component to the magnitude of the alternating current component, said second signal producing means including means for obtaining a direct current signal proportional to the direct current component in the line, other means for obtaining a direct current signal proportional to the alternating current component in the line, a transistor, and circuit means in which the two signals are applied in polarity opposition for biasing the transistor into conductive condition, energizing means for the tripping coil, and circuit means interconnecting the coil, the energizing means and the means for producing a second signal whereby an energizing potential is applied to the tripping coil at a calculated time to cause the contacts of the breaker to open at substantially zero current in said line.

3. A control circuit for a circuit breaker having a tripping coil and being adapted to break an alternating current line having a direct current component flowing therein, the circuit breaker having an invariable inherent time delay between the application of a tripping potential of predetermined amplitude thereto and the complete breaking of the contacts thereof, said time delay not exceeding one half the time duration of one alternation of the alternating current, comprising, in combination, means connected to the line and responsive to a fault current in the line for obtaining two timed signals, said two timed signals occurring at the crests of the positive and negative alternations respectively of the alternating current in the line, normally inactive signal generating means, means connected to the line and interconnecting the signal generating means and the means for obtaining two timed signals whereby the signal generating means is selectively activated by one of the two timed signals in accordance with the direction of flow of the direct current component in the line, and time delay circuit means including a source of tripping potential interconnecting the signal generating means and the tripping coil for utilizing the last-named signal for controlling the application of the potential to the coil, said time relay circuit means including means connected to the line and interposed between the signal generating means and the circuit breaker for delaying the application of the tripping potential by an additional time, at least a portion of said additional time being a function of the ratio of the amplitude of the direct current component to the amplitude of the alternating current component whereby the breaker contacts are opened at an instant corresponding to true zero current in said line.

4. In control apparatus for use with an alternating current line having a direct current component flowing therein for obtaining an electrical signal at a selected one of two instants, one of said instants corresponding to the crest of an alternation of one polarity of the alternating current when the direct current component in the line flows in one direction, the other of said instants corresponding to the crest of an alternation of opposite polarity when the direct current component in the line flows in the other direction, in combination, a transformer having the primary thereof connected in said line and having first and second secondaries, first and second transistors, circuit means including differentially connected dual capacitor biasing means connecting the first and second transistors to said first secondary whereby the first and second transistors are selectively biased in forward directions by the signal induced in the first secondary selectively in accordance with the asymmetry of said signal resulting from the direction of the flow of the direct current component, first and second controlled rectifiers having control elements operatively connected to said first and second transistors respectively and to be rendered conductive while the first and second transistors are conductive, a source of potential, signal producing means for producing a signal while a potential is applied thereto from said source, circuit means connecting the main anode cathode current paths through the first and second controlled rectifiers in parallel with each other and in series with the source of potential whereby an electrical signal is produced when one of said controlled rectifiers becomes conductive, phase shift means operatively connected to said second secondary, square wave generator means connected to said phase shift means to receive the output therefrom and to produce a square wave, differentiator means operatively connected to the square wave generator means to receive the output therefrom, and circuit means operatively connecting the differentiator means to the first and second transistors and to the control elements of the first and second controlled rectifiers for applying pulses to the first and second transistors and to the first and second controlled rectifiers to selectively turn on their associated controlled rectifiers respectively in accordance with the bias voltage from the first secondary and accordingly in accordance with the direction of the flow of the direct current component in the line.

5. A circuit breaker having a tripping coil and being adapted to break an alternating current line having a direct current component flowing therein, comprising in combination, normally non-conductive first transistor means, circuit means connecting the first transistor means to the line whereby the first transistor means is rendered conductive when a fault current occurs in the line, other circuit means including a resistor, a pair of parallel connected controlled rectifiers and a source of potential connected to the first transistor means whereby current flows through the resistor when one of said controlled rectifiers is rendered conductive while the first transistor means is conductive, means connected to the line for rendering a selected one of the pair of controlled rectifiers conductive at a selected one of two instants in accordance with the direction of flow of the direct current component in the line, one of said instants corresponding to the crest of the positive alternation of the alternating current in said line, the other of said instants corresponding to the crest of the negative alternation of the alternating current in said line, and further circuit means including second transistor means, a source of energizing potential and timing means interconnecting the resistor and the tripping coil whereby a tripping potential is applied to the coil a variable time after current begins to flow in said resistor, at least a portion of said variable time varying in accordance with variations in the ratio of the amplitude of the direct current component to the amplitude of the alternating current component in said line.

6. An alternating current circuit breaker control circuit including, in combination, a transformer having first, second, and third secondaries and a primary adapted to be connected in series in the protected circuit, transistor means including a normally non-conductive control transistor connected to the first secondary whereby a fault current in the protected circuit causes the control transistor to become conductive, other normally non-conductive transistor means operatively connected to the first-named transistor means, circuit means connecting the other transistor means to said second secondary whereby the other transistor means receives a biasing potential from said second secondary, additional circuit means connecting the other transistor means to the third secondary whereby the other transistor means is turned on at a selected moment during a selected alternation of the positive and negative alternations in the protected circuit current after a fault current has turned on the control transistor, breaker means having the breaker contacts thereof in said protected circuit and having a tripping solenoid, said solenoid causing the breaker contacts to open a predetermined time after the application of an energizing potential to the solenoid, a source of energizing potential, and further circuit means including timing means interconnecting the other transistor means, the source and the solenoid for applying the energizing potential to the solenoid at a calculated instant whereby the breaker contacts are opened at substantially the moment when the current in the protected circuit is zero.

7. Circuit breaker apparatus for use with an alternating current line having a direct current component flowing therein comprising, in combination, first timing and switching means including a first normally open circuit, the first timing and switching means being operatively connected to the line and responsive to a fault current in the line for closing the first normally open circuit at an instant selected from one of the instants corresponding to the crest of a negative alternation and the crest of a positive alternation of the alternating current, the instant being selected in accordance with the direction of flow of the direct current component, second timing and switching means including a second normally open circuit, means connecting the first circuit of the first timing and switching means to the second timing and switching means for initiating the operation of the timing means of the second timing and switching means upon the closing of the first circuit, said second timing and switching means being connected to the line and resulting in the closing of the second circuit therein a measured time after the closing of the first circuit, at least a portion of said measured time being proportional to the ratio of the magnitudes of the direct current component to the alternating current component in the line, circuit breaker means having contacts connected in the line, the circuit breaker means having a coil and a predetermined unvarying inherent time delay between the application of a tripping potential thereto and the opening of the contacts, and circuit means including a source of potential connecting the second circuit of the second timing and switching means to the circuit breaker for applying a tripping potential thereto and opening the contacts thereof.

8. A control circuit for a circuit breaker having a tripping coil and being adapted to break an alternating current line having a direct current component flowing therein, the circuit breaker having a consistent inherent time delay between the application of a tripping potential thereto and the complete breaking of the contacts thereof, said time delay being substantially equal to one half the time duration of one alternation of the alternating current, comprising, in combination, means connected to the line and responsive to a fault current in the line for obtaining a timed signal at a signal instant which precedes the instant when the alternating current component alone goes to zero by a time interval equal to said inherent time delay, said instant being selected in accordance with the polarity of the direct current component, and circuit means including a source of tripping potential, a switching device, and time delay means interconnecting the timed signal obtaining means and the tripping coil for applying the potential to the coil, the time delay means being initiated by the timed signal and including means connected to the line for obtaining a first signal proportional to the D.-C. component of current, means connected to the line for obtaining a second signal proportional to the A.-C. component of current, means for rectifying the last-named signal, a capacitor operatively connected to the rectifying means, and means for utilizing the first signal and the rectified second signal to delay the operation of the switching device by a time at least a portion of which is proportional to the ratio of the magnitude of the direct current component to the alternating current component, the switching device applying the tripping potential to the coil whereby the breaker contacts are opened at an instant corresponding to true zero current in said line.

9. In a control circuit for a circuit breaker for use in a multiphase alternating current circuit including at least a first phase and a second phase, in combination, first breaker means having contacts in a first phase conductor and having a first invariable inherent time delay between the application of a tripping potential of predetermined amplitude thereto and the opening of the contacts, second breaker means having contacts in a second phase conductor and having a second invariable inherent time delay between the application of another tripping potential of predetermined amplitude thereto and the opening of the contacts, means responsive to a fault current occurring in the first phase conductor for anticipating the time when the current in the first phase conductor will become zero current and for applying a tripping potential to said first breaker means a time interval before said zero current corresponding in duration to the first inherent time delay, means responsive to a fault current occurring in the second phase conductor for anticipating the time when the current in the second phase conductor will become zero current and for normally applying a tripping potential to said breaker means a calculated time interval before said last-named zero current corresponding in duration to the second inherent time delay, the breaking of the first phase conductor resulting in a sudden abnormal change in current in said second phase conductor, and means responsive to the abnormal change in current in the second phase conductor for altering the calculated time of application of a tripping potential to the second breaker means whereby a tripping potential is applied to the second breaker means at substantially the correct moment to cause the contacts of the second breaker means to open at zero current in the second phase conductor.

10. A control circuit for a circuit breaker for use in a plural phase line comprising, in combination, breaker means for one phase having a control solenoid and contacts breaking the circuit of said one phase a predetermined time after the application of an energizing potential to said solenoid, other breaker means for another phase including an additional solenoid and contacts breaking the circuit of the other phase a predetermined time after the application of an energizing potential to the additional solenoid, means responsive to a fault current selected from the one phase and the other phase for applying an energizing potential to the solenoid of the first-named breaker means at a selected instant whereby the contacts of the first-named breaker means open when the current in the one phase circuit is substantially zero, the breaking of the circuit of said one phase resulting in a change in current and phase in the circuit of said other phase whereby the instant when current in the circuit of said other phase becomes zero is advanced, and means connected to the circuit of said other phase for applying an energizing potential to the additional solenoid of the other phase at a time taking into account the change in current and phase in the circuit of said other phase, whereby the contacts in the circuit of said other phase are broken at substantially the moment when the current in said other phase circuit becomes zero.

11. A circuit according to claim 3 including in addition means connected to the line for obtaining a voltage resulting from a sudden change in phase and current in the line resulting from the fault changing from a high impedance to a low impedance fault, and circuit means connecting the voltage obtaining means to the time delay circuit means for further delaying the application of the tripping potential to the coil in accordance with the magnitude of said changes in phase and current whereby the contacts are opened at true zero current in the line.

12. Circuit breaker apparatus for use in a line carrying alternating current and having a direct current component therein comprising, in combination, a circuit breaker having an inherent invariable time delay between the application of a predetermined potential thereto and the opening of the contacts thereof, means connected to the line and responsive to a fault current in the line for obtaining a voltage at a selected one of two instants, one of said instants corresponding to the crest of the positive alternation of the alternating current in the line, the other of said two instants corresponding to the crest of the negative alternation of the alternating current in the line, the instant selected being in accordance with the polarity of the direct current in the line, means connected to the line for measuring the ratio between the magnitudes of the direct current component and the alternating current component, said last-named means including timing circuit means and a normally open circuit, said normally open circuit being closed a time interval after the application of said potential to the timing circuit means in accordance with said ratio, circuit means including energizing means and switching means connecting the timing circuit means to the circuit breaker, and direct current voltage obtaining means connected to the line for obtaining a D.-C. voltage which varies in amplitude in accordance with variations in the current and phase in the line resulting from a change in impedance of the line, the D.-C. voltage obtaining means being connected to the switching means for altering the time of closing of the switching means in accordance with the magnitude of the D.-C. voltage.

References Cited by the Examiner

UNITED STATES PATENTS

| 1,708,384 | 4/1929 | Fox. |
| 1,848,298 | 3/1932 | Aalborg. |
| 2,372,139 | 3/1945 | Van Sickle. |
| 2,412,092 | 12/1946 | Mayle. |
| 2,564,179 | 8/1951 | Tejada-Flores. |
| 2,771,577 | 11/1956 | Kesselring. |

MILTON O. HIRSHFIELD, *Primary Examiner.*

SAMUEL BERNSTEIN, *Examiner.*

R. V. LUPO, *Assistant Examiner.*